No. 842,950. PATENTED FEB. 5, 1907.
H. GERNSBACK.
BATTERY CELL.
APPLICATION FILED JUNE 28, 1906.
2 SHEETS—SHEET 1.
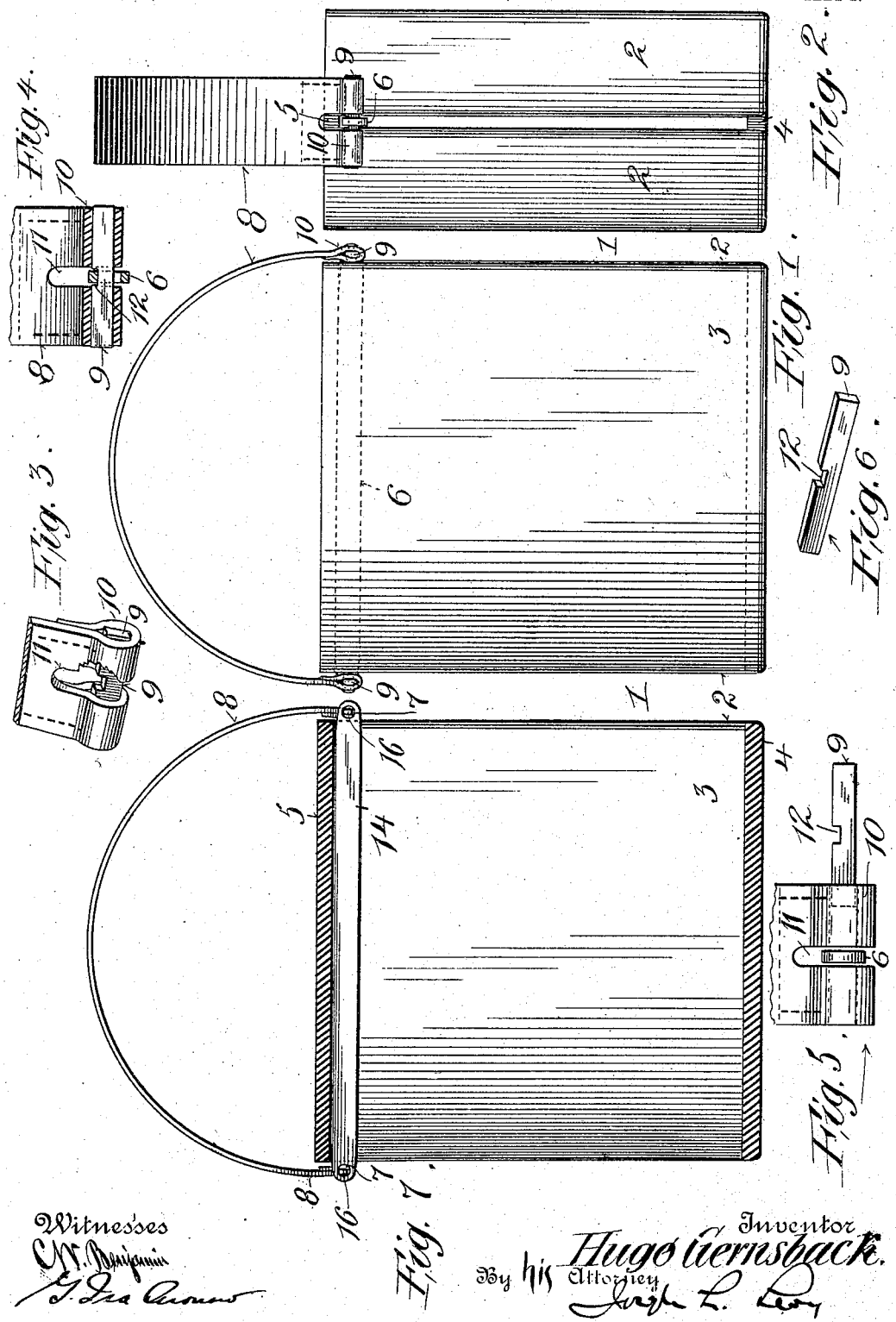
Witnesses
Inventor
Hugo Gernsback.
By his Attorney

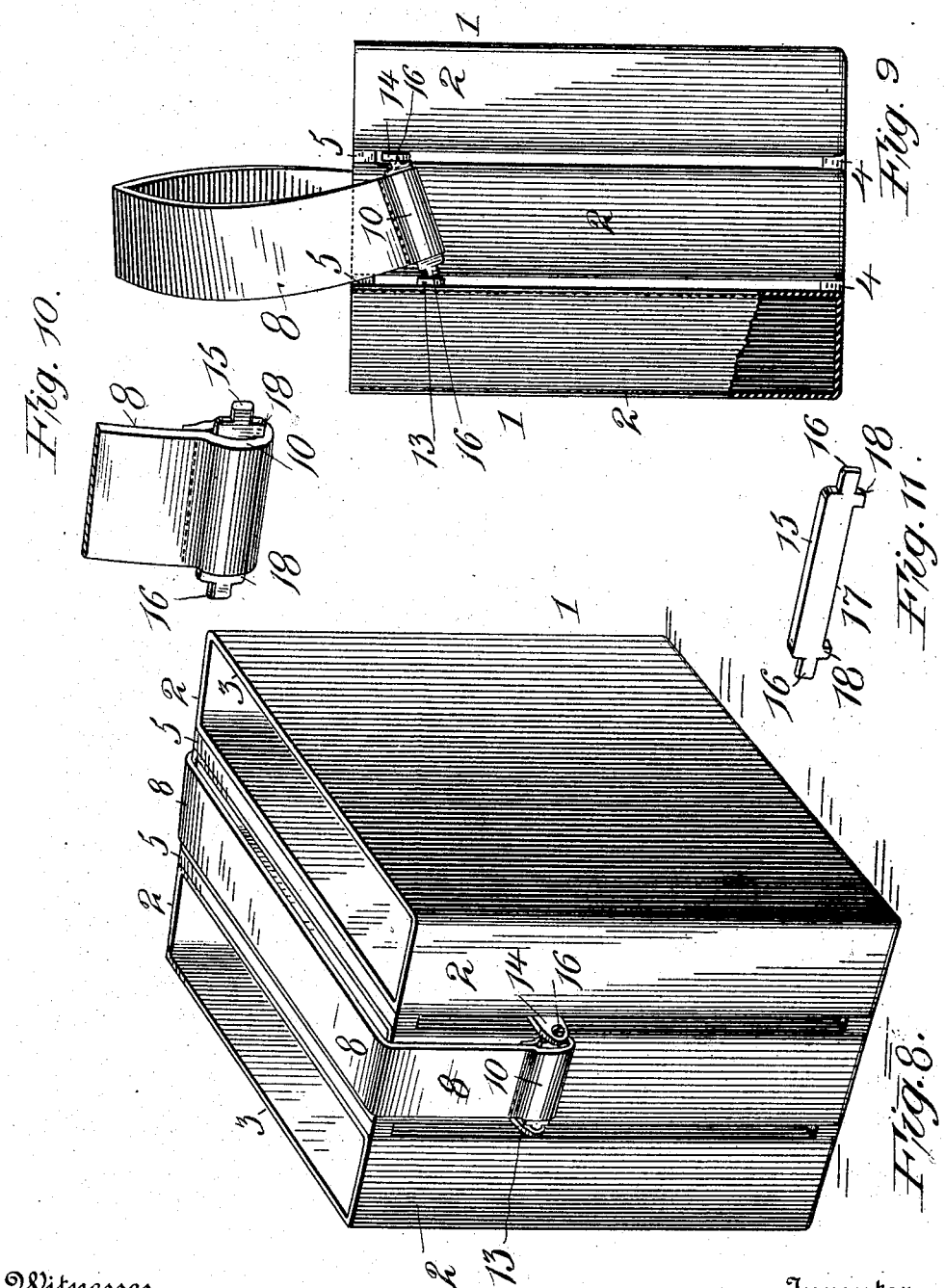

UNITED STATES PATENT OFFICE.

HUGO GERNSBACK, OF NEW YORK, N. Y., ASSIGNOR TO ROYAL BATTERY COMPANY, A CORPORATION OF NEW YORK.

BATTERY-CELL.

No. 842,950.  Specification of Letters Patent.  Patented Feb. 5, 1907.

Application filed June 28, 1906. Serial No. 323,943.

*To all whom it may concern:*

Be it known that I, HUGO GERNSBACK, a subject of the Grand Duchy of Luxemburg, and a resident of the city, county, and State of New York, have invented certain new and useful Improvements in Battery-Cells, of which the following is a specification.

The object of my invention is to provide cells which are spaced apart, so as to have an air-space between them, in order that there will be no electrical transmission between the cells in case of a defect in the making and also to provide a suitable carrying-handle without having to have a carrying-receptacle for the cells. The handle is also secured so as to be removable and so that it will take up very little space and may be pressed down close to the cells when not in use.

Other advantages of my improvements will appear from the description hereinafter.

In the drawings forming part of this application, Figure 1 is a front elevation of two cells made in accordance with my invention. Fig. 2 is a side elevation of the same. Fig. 3 is a perspective view of the end of the strap, showing the pin therein. Fig. 4 is a vertical section through the same. Fig. 5 is an elevation showing the method of connecting the parts. Fig. 6 is a perspective view of the pin. Fig. 7 is a section through Fig. 9. Fig. 8 is a perspective view showing how three or any other odd number of cells are used. Fig. 9 is a side elevation of the same. Fig. 10 is a perspective view of the strap end and connection for three cells, and Fig. 11 is a perspective view of the pin.

The cells 1 are made as usual of celluloid, hard rubber, &c., and are preferably of an oblong shape and each made of one piece of material and having ends 2 and sides 3. The cells are placed side by side, as shown in Fig. 2, and are secured together by spacing-blocks 4 and 5, one of which is preferably placed near the bottom edge of the cells and the other near the top edge. The blocks are secured to the cell-walls by cement or otherwise, according to the material of the cells, and are made of insulating material—at least the upper one is—so that a space is formed between the cells. If there should be a slight crack in the wall of the cell owing to a defect in making, there will be no electrical leakage between the cells owing to the space. The top block also serves for another purpose.

Heretofore it has been customary to place the cells in another receptacle for carrying, but which is made unnecessary by my invention, making the same more economical and easier to handle.

For two cells, as is shown in Figs. 1 and 2, I provide a flat bar 6, which is long enough to extend the length of the cells, and it is placed between the two cells. There should be slight friction between the bar and the cells to hold the former in any desired position. The bar is provided at each end with an aperture 7 (illustrated in Fig. 7) in the end of bar 14.

For the purpose of carrying the cells I provide a strap 8, the ends of which are secured to the bar on each end of the cells by a pin 9. The ends of the strap are formed with loops 10 and preferably a recess 11, the former being adapted to have the pin passed therethrough. The pin is provided with a recess 12.

When the bar is placed between the cells, so that the ends extend beyond the same, the strap ends are placed thereon by passing the pin 9 through the loop and through the aperture in the end of the bar, and the recess 11 receives the end of the rod. When in place, the recess 12 in the pin receives the end of the rod, so that when carrying the pin will not move longitudinally.

When not in use, the rod may be pushed downwardly, when the strap will be brought close to the cell and take up but very little space. When picked up, the weight of the cells will cause the strap to pull the rod up until it engages with the block 5 again.

In Figs. 8 to 11 I have shown the method of applying the handle to three or more cells. When there is an odd number of cells, they would not carry properly if the rod was placed between two cells, so I provide two rods 13 and 14, which are like the rod 6. They are placed each between two of the cells, as was the rod 6, so that their ends extend outwardly. The strap in this case has similar loops 10, but no recess 11, as it is not now necessary. A pin 15, having reduced ends 16 and a recess 17, formed between the lugs 18, is passed through the loop in the strap before the latter is sewn or otherwise secured. The lugs 18 engage the strap and prevent the pin from coming out of the loop.

As will be seen in Fig. 9, the end of one of the rods is pressed below the other rod, when their apertures will be sufficiently far apart so that by tipping the pin 15 on a slant the ends 16 may be inserted in the apertures 7, when the rods are brought parallel and the pin will hold to the rods. The pin is released from the rods by reversing this movement. In this form also the rods may be pushed down, as shown in Fig. 8, until the strap is secured close to the cells. It will be seen from this that I have done away with a receptacle for carrying the cells and provided a convenient carrier, which is compact and may be secured to the cells regardless of how thin the material of the cell is.

Having described my invention, what I claim is—

1. The combination of a plurality of battery-cells, having a spacing-block securing the cells near their tops, and means engaging the said block, for carrying the cells.

2. The combination of a plurality of battery-cells secured together and spaced apart, a rod passing between the cells and a handle secured to the rod for carrying the cells.

3. The combination of a plurality of battery-cells secured together by a spacing member, a rod between the cells and having ends projecting beyond the cells, and a flexible handle secured to the ends of the rod, said rods being adapted to engage the spacing member for carrying the cells, and to be lowered between the cells to secure the handle close to the cells.

4. The combination of a plurality of battery-cells, spaced apart by a spacing member, a rod between the cells, and a flexible handle having loops on the ends thereof, which straddle the ends of the said rod, and a pin securing the loops and the rod ends together.

5. The combination of a plurality of battery-cells, spaced apart by a spacing member, a rod between the cells, having a handle provided with loops which straddle the ends of the said rods, the said rods having apertures therethrough, and a pin in the loop and rod-aperture, having a recess engaging the rod, whereby shoulders are formed on the pin which prevent the latter from moving longitudinally.

6. A plurality of battery-cells, spaced apart by spacing-blocks, and a pair of rods between the several cells, and a carrying-handle secured to the ends of said rods on opposite ends of the cells.

7. A plurality of battery-cells, means spacing the cells apart, a plurality of rods (13 and 14) between the several cells, which are adapted to be moved vertically, a carrying-handle, and pins secured to the handle and adapted to engage apertures in the said rods and to secure the handle thereon.

8. A plurality of battery-cells 1, spaced apart by spacing-blocks, a plurality of rods (13 and 14) extending beyond the cells and provided with apertures in their ends, a handle having a loop 10, a pin 15 having projections on each side of the loop and provided with ends which engage with the apertures in the said rods, said rods being slidable vertically.

Signed this 26th day of June, 1906.

HUGO GERNSBACK.

Witnesses:
CHAS. G. HENSLEY,
L. MARIE JURY.